(12) United States Patent
Choi

(10) Patent No.: US 8,372,284 B2
(45) Date of Patent: Feb. 12, 2013

(54) PLANT FOR AEROBIC AND ANAEROBIC DIGESTION TREATMENT BY PFR

(75) Inventor: Hong Bok Choi, Seoul (KR)

(73) Assignee: Ecodays Co., Ltd., Seoul (KR)

( * ) Notice: Subject to any disclaimer, the term of this patent is extended or adjusted under 35 U.S.C. 154(b) by 264 days.

(21) Appl. No.: 12/669,862

(22) PCT Filed: Jul. 17, 2008

(86) PCT No.: PCT/KR2008/004196
§ 371 (c)(1),
(2), (4) Date: Jan. 20, 2010

(87) PCT Pub. No.: WO2009/014346
PCT Pub. Date: Jan. 29, 2009

(65) Prior Publication Data
US 2010/0187187 A1    Jul. 29, 2010

(30) Foreign Application Priority Data

Jul. 20, 2007  (KR) .......................... 10-2007-0072928
Nov. 13, 2007  (KR) .......................... 10-2007-0115614

(51) Int. Cl.
*C02F 3/30* (2006.01)
(52) U.S. Cl. ........ 210/603; 210/605; 210/259; 210/261; 210/903
(58) Field of Classification Search ................ 210/603, 210/605, 620, 630, 252, 259, 261, 902, 903
See application file for complete search history.

(56) References Cited

U.S. PATENT DOCUMENTS

| 5,514,278 | A | * | 5/1996 | Khudenko | 210/605 |
| 5,578,214 | A | * | 11/1996 | Yamasaki et al. | 210/650 |
| 6,387,254 | B1 | * | 5/2002 | Takechi et al. | 210/195.1 |
| 6,733,662 | B2 | * | 5/2004 | Pollock | 210/97 |
| 6,984,323 | B2 | * | 1/2006 | Khudenko | 210/603 |
| 2003/0085171 | A1 | * | 5/2003 | Khudenko | 210/603 |

FOREIGN PATENT DOCUMENTS

| JP | 2002-219486 A |  | 8/2002 |
| KR | 10-2004-0064579 A |  | 7/2004 |
| KR | 100470925 B1 | * | 3/2005 |
| KR | 10-2006-0089927 A |  | 8/2006 |
| KR | 100628481 B1 | * | 9/2006 |

OTHER PUBLICATIONS

PCT International Search Report of International Application No. PCT/KR2008/004196, (dated Jan. 20, 2009).

* cited by examiner

*Primary Examiner* — Fred Prince
(74) *Attorney, Agent, or Firm* — Kile Park Goekjian Reed & McManus PLLC

(57) ABSTRACT

Disclosed are a wastewater treatment plant and a wastewater treatment method. The wastewater treatment plant includes: a reactor including a gas outlet, a treated water outlet, and an inlet through which wastewater and gas are supplied, through which the wastewater is introduced, to perform aeration and denitrification; a sludge separation means including plural reaction unit bodies stacked inside the reactor to divide the interior of the reactor into upper and lower sides and separating sludge in a aeration process by forming a gas hold-up space for collecting the gas rising from a lower portion of the reactor; and a aeration unit introducing gas into the reactor.

27 Claims, 15 Drawing Sheets

PLANT FOR AEROBIC AND ANAEROBIC DIGESTION TREATMENT BY PFR

TECHNICAL FIELD

The present invention relates to a water treatment plant and a water treatment method, and more particularly, to a water treatment plant capable of efficiently treating strong organic wastewater by stacking a plurality of reaction unit bodies and performing aerobic and anaerobic digestion treatments

BACKGROUND ART

In general, an aerobic or anaerobic digestion treatment is performed in a completely stirred tank reactor (CSTR) that is being currently used.

However, strong organic wastewater introduced into a CSTR is completely mixed in the reactor and is discharged by the amount of introduced strong organic wastewater, in which case treatment efficiency and treatment rate are low.

In addition, an aerobic or anaerobic digestion treatment must be essentially accompanied by mixing of fluids in consideration of the properties and reactions of the fluids, therefore it is difficult to avoid complete mixing of fluids while performing a desired mixing operation.

Accordingly, a sequencing batch reactor (SBR) controlling mixing and discharge together, a separation reactor, or an upflow anaerobic sludge blanket (UASB) are being used in a treatment process, but they also show efficiencies similar to that of a CSTR.

Moreover, induction of treatment of strong organic wastewater by a CSTR is problematic due to recent global warming, generation of a large amount of strong wastewater, and regulation of total emission.

DISCLOSURE OF INVENTION

Technical Problem

The present invention provides a water treatment plant and a water treatment method using a plug flow reactor in which the interior of a reactor is multi-staged, and gas hold-up space are formed between the stages to interrupt flow of fluid or increase fluidity of liquid, whereby the circulation and transfer rate between gas and liquid are increased.

The present invention also provides a water treatment plant and a water treatment method in which by applying a plug flow reactor (PFR) method, in the case of the aerobic treatment, high concentration of dissolved oxygen (DO), a large number of microorganisms, and a high concentrations of pollutants in wastewater are secured at the lowermost stage of the reactor and they become gradually reduced as they flow to the up stage of the reactor, thereby creating a typical reactor flow of a PFR, and, in the case of the anaerobic treatment, high concentrations of organic materials and microorganisms are secured at the lowermost stage of the reactor and their concentrations become lower resulting in maintaining an optimum pH, which can be lowered at the lowermost stage due to the fermentation processes.

The present invention also provides a water treatment plant and a water treatment method that can solve problems occurring in a conventional CSTR type wastewater treatment plant.

Technical Solution

Therefore, the present invention has been made in view of the above problems, and it is an objective of the present invention to provide a water treatment plant comprising: a reactor for aeration, nitrification and denitrification of wastewater; the reactor composed of plural reaction unit stacked stages dividing the reactor into upper and lower sides, and including sludge separation system during the aeration process by building up gas hold-up space which can hold uprising gases from the lower stage of the reactor; and wastewater treatment equipments including air distribution units aerating the reactor.

Advantageous Effects

As the detailed description, according to the present invention, the wastewater treatment equipments and processes are composed of maintain the PFR characteristics of the reaction rate and fluid flow by the interior of the reactor or the flocculation system is multi-staged by plural stacking of reaction unit bodies and gas hold-up spaces are formed between the stages to interrupt flow of fluid or increase fluidity of liquid, whereby the circulation and transfer rate between gas and liquid are increased.

Further, construction time and cost can be reduced by the vertical plural stacking of reaction unit bodies, making installation of the reactor convenient.

Furthermore, the various types of designs for the reactor are possible by varying the shape of the unit body of the reactor.

BRIEF DESCRIPTION OF THE DRAWINGS

The above and other objects, features and other advantages of the present invention will be more clearly understood from the following detailed description taken in conjunction with the accompanying drawings, in which.

BEST MODE FOR CARRYING OUT THE INVENTION

Hereinafter, a wastewater treatment plant according to preferred embodiments of the present invention will be described in detail with reference to the accompanying drawings.

Figure 1:
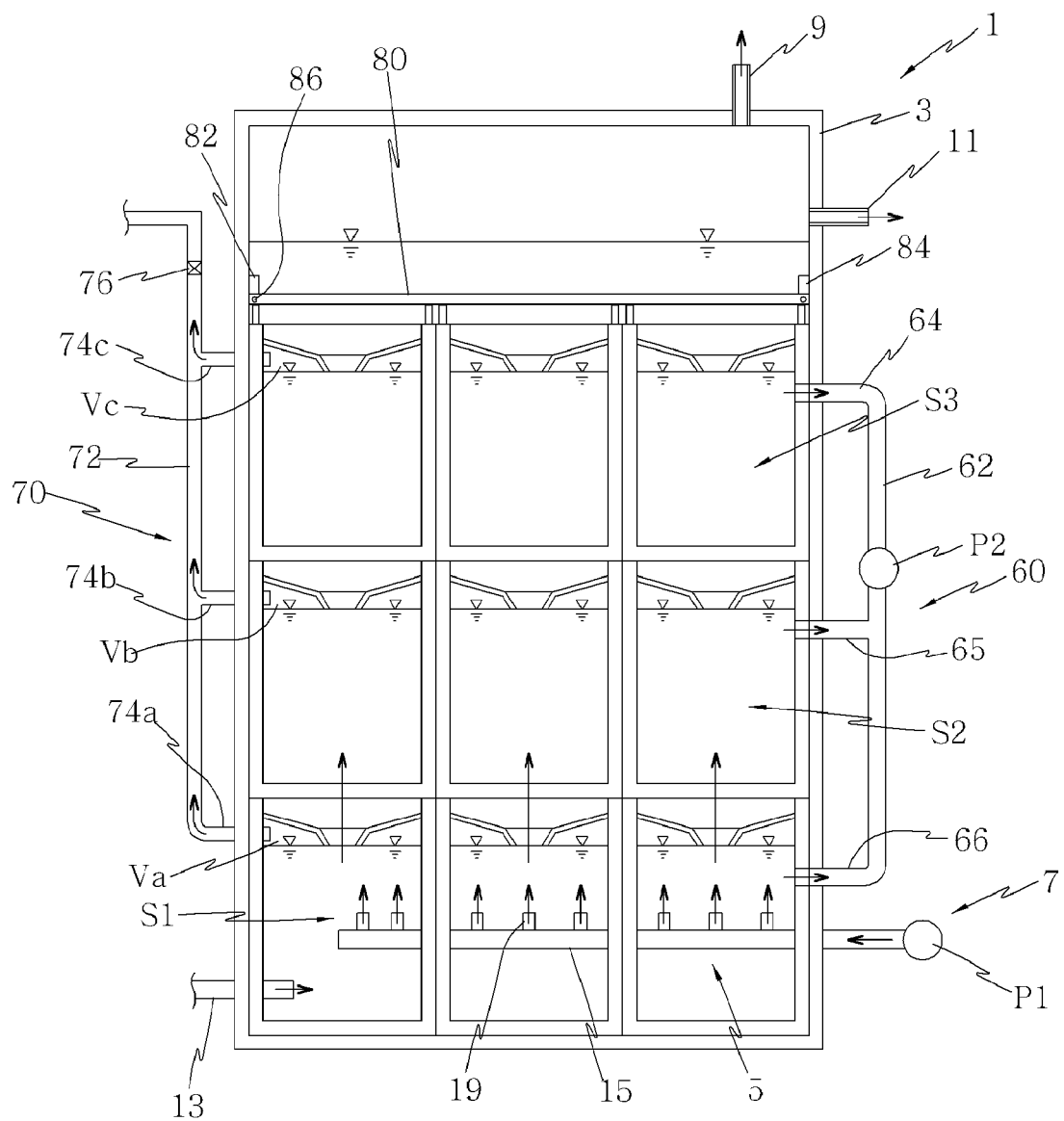
FIG. 1 is a side view illustrating the internal structure of a water treatment plant according to an embodiment of the present invention.

As illustrated in FIG. 1, the wastewater treatment plant according to an embodiment of the present invention includes a reactor 3 into which wastewater and air are introduced to perform aeration and denitrification, at least one sludge separation unit S1, S2, and S3 having plural reaction unit bodies stacked as five stages inside the reactor 3 to move the introduced wastewater and gases upward in the order of their densities and decompose contaminants by increasing the interfacial area between the wastewater and the bubbles and thereby increasing dissolved oxygen (DO), and a bubbling unit 7 introducing a gas into the interior of the reactor 3.

The reactor 3 may function as an aeration reactor or a denitrification reactor according to its treatment process. The reactor 3 is tube-shaped to introduce wastewater and air into a space formed therein. The reactor shape may be cylindrical, hexahedral, or octahedral.

The reactor includes a gas outlet 9 through which the bubbles that have passed through the sludge separation units S1, S2, and S3 are discharged outside the reactor 3 and a treated water outlet 11 through which the wastewater that has passed through the sludge separation units S1, S2, and S3 is discharged to the outside.

A wastewater inlet pipe 13 for supplying wastewater and gas is connected to a lower portion of the reactor 3. The gas includes air or methane gas. An aerobic treatment may be necessary when air is injected and an anaerobic treatment may be necessary when methane gas is injected.

When anaerobic treatment is carried out by injecting methane gas into the interior of the reactor 3, a conventional gas collecting unit may be provided to the gas outlet 9.

The wastewater introduced through the wastewater inlet tube 13 fills the interior of the reactor 3 from the bottom.

The aeration unit 7 is mounted to an upper portion of the wastewater inlet tube 13 to introduce exterior gas into the reactor 3.

The aeration unit 7 includes an inlet tube 15 connected to the inside of the reactor 3, at least one nozzle 19 protruding from the inlet tube 15, and a blower P1 provided on one side of the inlet tube 15 to blow out gas.

Accordingly, the gas introduced through the inlet pipe 15 by the blower P1 may be uniformly injected to the wastewater through the plural nozzles 19.

The sludge separation units S1, S2, and S3 include at least one sludge separation section, preferably, a first sludge separation section S1, a second sludge separation section S2, and a third sludge separation section S3. A stack of reaction unit bodies 5 is stacked in each of the first to third sludge separation sections S1, S2, and S3.

The reaction unit bodies 5 have the same shape, in which case one reaction unit body 5 will be described in detail hereinafter.

Figure 2:
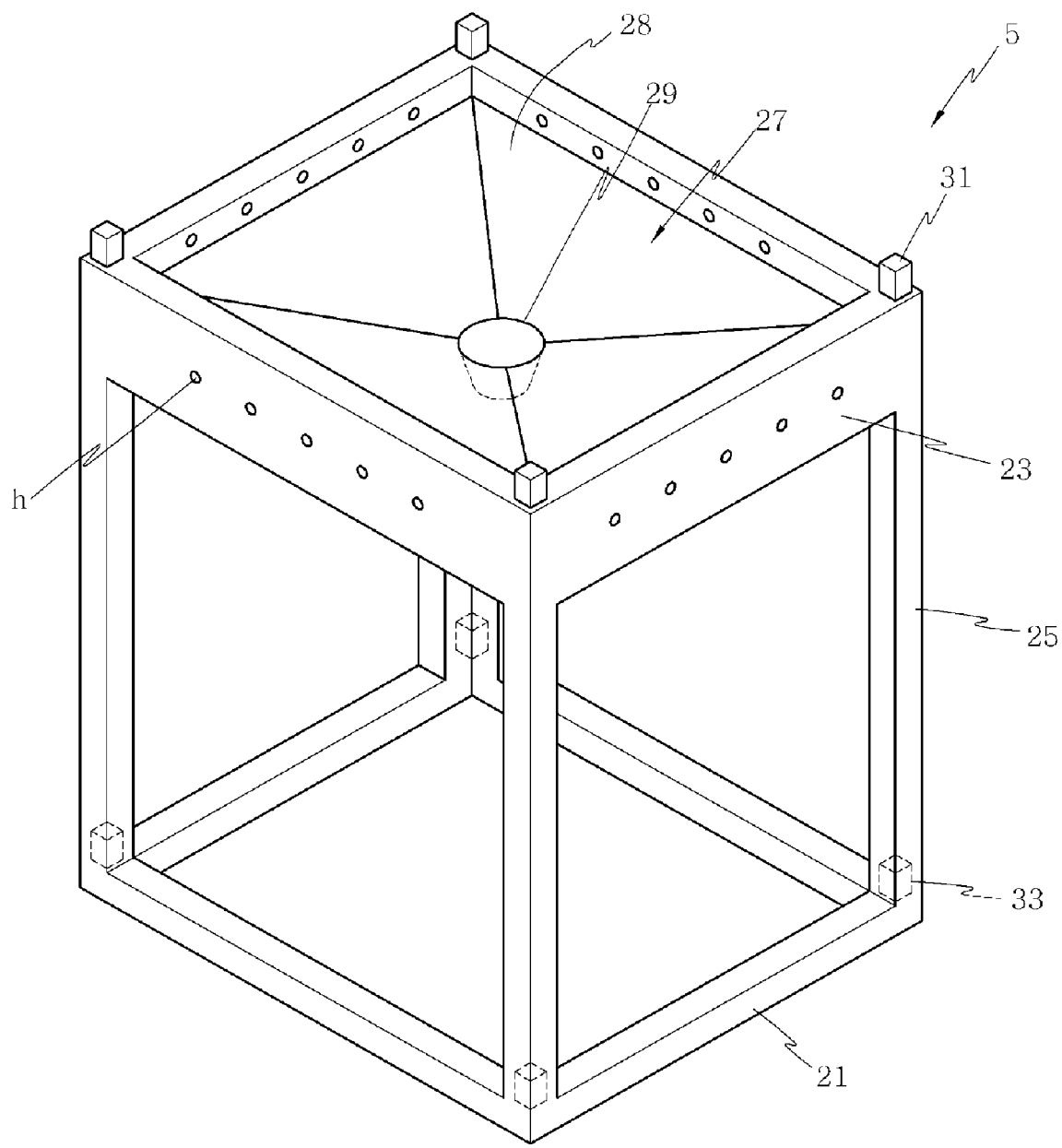
FIG. 2 is a perspective view illustrating a reaction unit body of the water treatment plant of FIG. 1.
Figure 3:
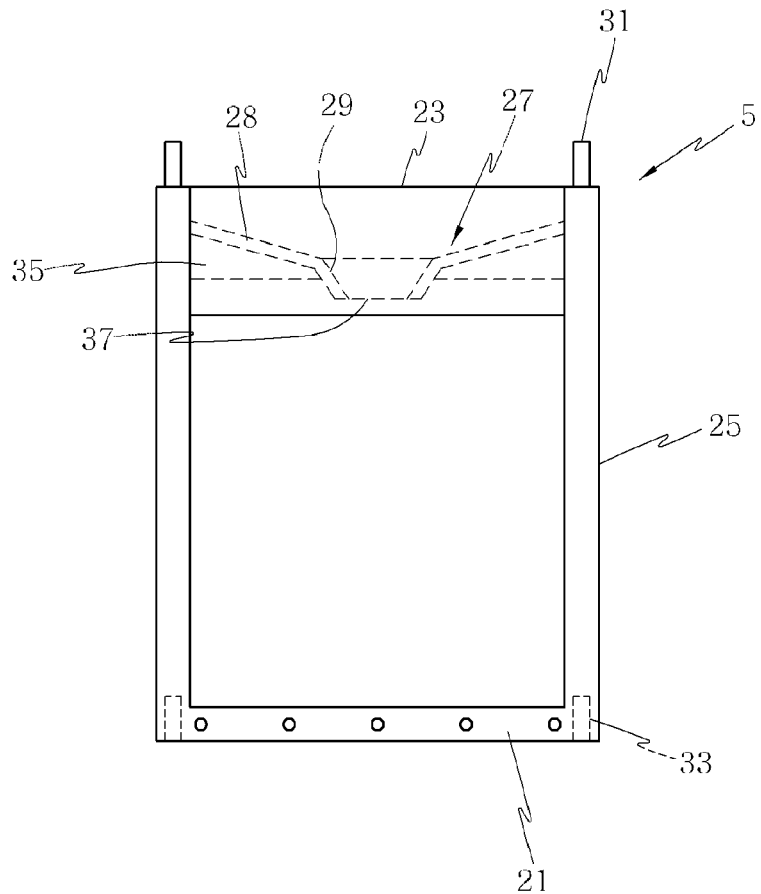
FIG. 3 is a side view illustrating the internal structure of the reaction unit body of FIG. 2.
Figure 4:
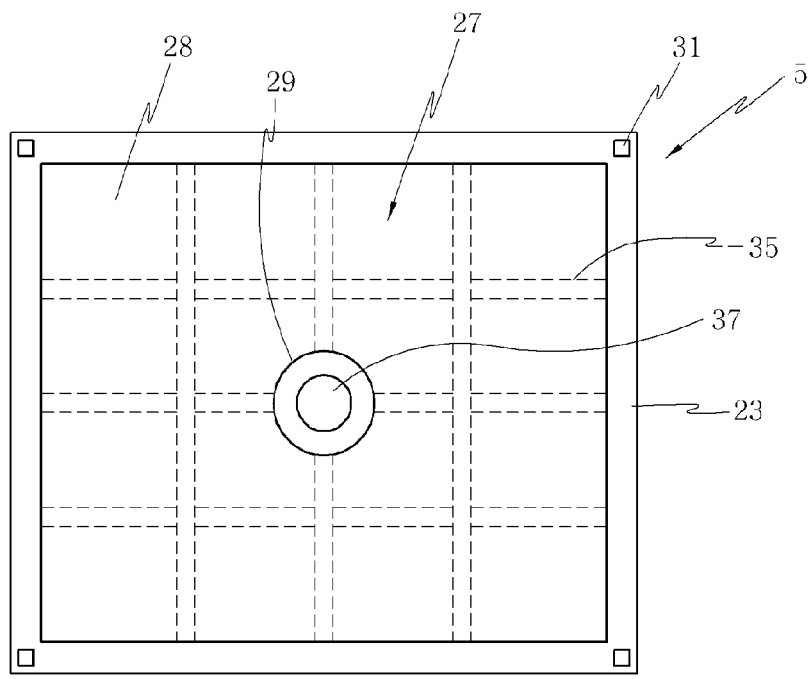
FIG. 4 is a plan view of FIG. 2.

As illustrated in FIGS. 2 to 4, the reaction unit body 5 includes upper and lower frames 23 and 21 corresponding to each other, a connection frame 25 connecting the upper and lower frames 23 and 21, an oblique plate 27 provided inside the frame 23 and partitioning the interior of the reactor 3 into upper and lower sides, a fluid flow pipe 29 provided in the oblique plate 27 to function as a passage for upward and downward flow of a fluid.

The oblique plate 27 is provided inside the upper frame to interrupt upward and downward flow of a fluid. The oblique plate 27 has a downwardly slanted shape, and a plurality of fluid flow pipes 29 that are passages for upward and downward flow of a fluid is provided at a central portion of the oblique plate 27.

Accordingly, when sludge is deposited on the upper surface of the oblique plate 27, it flows downward along the oblique surface 28 to be prevented from being stacked.

A reinforcing member 35 disposed on the bottom surface of the oblique plate 27 supports the oblique plate 27. The reinforcing member 35 protrudes downward from the bottom surface of the oblique plate 27 by a predetermined height and is transversely and longitudinally disposed about the fluid flow pipe 29.

Accordingly, the reinforcing member 35 can prevent the oblique plate 27 from moving or deflecting due to wastewater or gas during water treatment. The reinforcing member 35 has a bent structure where microorganisms can grow up.

The fluid flow pipe 29 protrudes downward from an intermediate portion of the oblique plate 27. The fluid flow pipe 29 is pipe-shaped and a fluid can flow upward and downward through the interior thereof.

Accordingly, when plural reaction unit bodies 5 are stacked inside the reactor 3, the reaction unit bodies 5 make contact with each other with the oblique plate 27 being connected sideward.

As a result, wastewater may flow upward and downward through the fluid flow tube 29 with wastewater being interrupted by the oblique plate 27.

More particularly, the fluid flow tube 29 has a funnel shape whose upper area is preferably larger than its lower area.

However, the fluid flow pipe 29 is not limited to the funnel shape, but may be conical or cylindrical. Furthermore, the same shape, size, length, and number of fluid flow pipes 29 may be provided in the same plate.

When the fluid flow tube 29 is varied as mentioned above, the wastewater introduced into the fluid flow tube 29 may variously induce the flow condition of fluid, the amount of high density material that moves downward from upside, and the various movement speeds according to the types of wastewater and the amount of gas. As a result, the efficiency and performance of water treatment may be increased by diversifying the shape of the fluid flow tube 29.

For example, when the fluid flow tube 29 is fan-shaped, an upwardly moving fluid is dispersed to prevent peripheral sludge from being deposited and accumulated near the fluid flow tube 29.

Meanwhile, the fluid flow tube 29 protrudes to the lower side of the oblique plate 27 by a predetermined length, and gas hold-up spaces Va, Vb, and Vc are formed on the bottom surface of the oblique plate 27.

Accordingly, the gas rising from a lower portion of the reactor 3 is collected in the gas hold-up spaces Va, Vb, and Vc, and if more than a predetermined amount of gas is collected, the gas is dispersed in all directions by a pressure to be supplied to the fluid flow tube 29.

Figure 7:
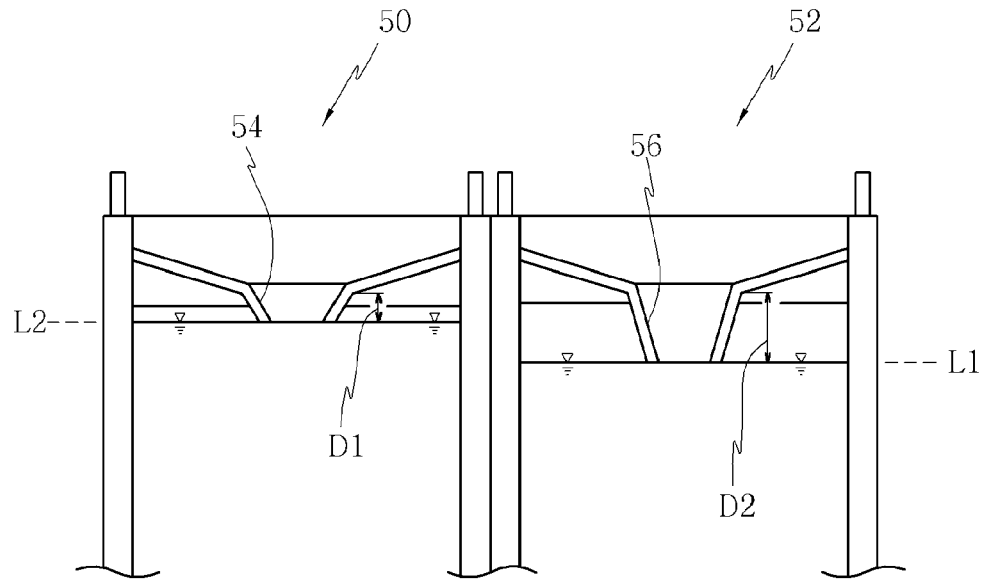
FIG. 7 is a side view illustrating another fluid flow pipe of the reaction unit body illustrated in FIG. 1.

Then, the fluid flow tube 29 preferably has the same length as that of a fluid flow tube 29 of an adjacent reaction unit body, but as illustrated in FIG. 7, the lengths of the fluid flow tubes 29 may be different.

In other words, in adjacent reaction unit bodies 50 and 52, the length D2 of the fluid flow tube 56 provided on one side may be longer than the length D1 of the fluid flow tube 54 provided on the other side.

In this way, since the length D2 of the fluid flow tube 56 is formed long, the change in water level and sludge movement may be activated inside the reactor 3.

In other words, when a gas gradually rises to form the gas hold-up space Va, Vb, and Vc on the bottom surface of the oblique plate 27, a first water surface L1 is formed.

When the gas additionally rises, some gas rises through the fluid flow tube 54 having a shorter length. Then, some gas that has not escaped through the short fluid flow tube 54 is gradually collected to press the first water surface L1 downward and form a second water surface L2.

The gas in the stay spaces Va, Vb, and VC formed in the second water surface L2 flows upward through the short fluid flow pipe 54.

The movements of the first water surface L1 and the second water surface L2 increase the fluidity of the fluid due to change in the water surfaces.

Then, the interval between the second water surface L2 and a long fluid flow tube 56 is so short that the resistance of the gas is relatively small, whereby almost all the upwardly or downwardly flowing sludge flows downward through the long fluid flow tube 56.

Gas does not flow or rarely flows at the upper end of the long fluid flow tube 56, in which case MLSS of substantially high concentration gathers there and sludge of high concentration may selectively flow downward.

Maintenance of the high concentrated slurry at the lower end of the long fluid flow tube 56 is a very important factor in reducing the amount of transferred slurry and increasing treatment rate.

Figure 8:
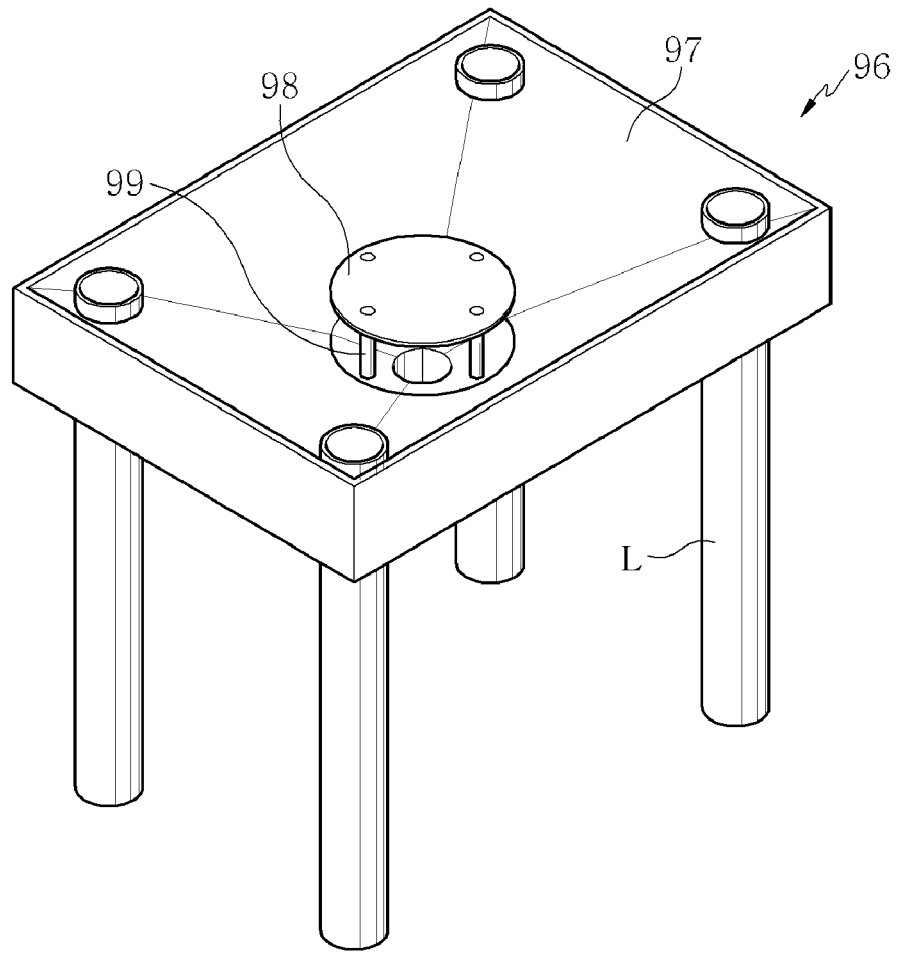
FIG. 8 is a perspective view illustrating a reaction unit body according to another embodiment of the present invention.
Figure 9:
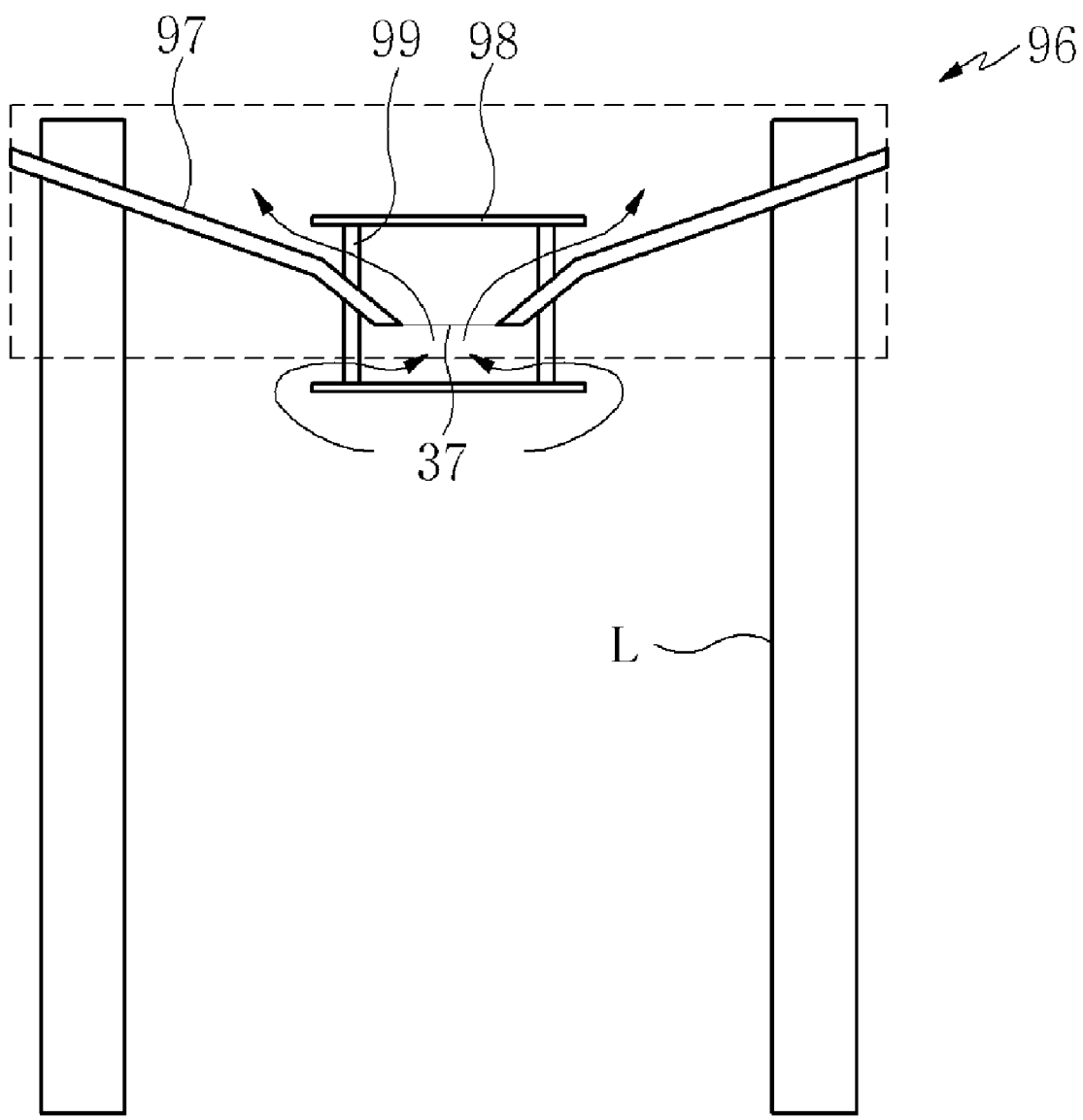
FIG. 9 is a sectional view of the reaction unit body illustrated in FIG. 8.

FIGS. 8 and 9 illustrate a reaction unit body according to another embodiment of the present invention. The reaction unit body includes an upper frame 80, an oblique plate 97 provided inside the upper frame 80, upper and lower caps 81 and 83 provided in the oblique plate 97, and a leg connected to the upper frame 80.

The upper and lower caps 81 and 83 are provided on the upper and lower surfaces of the oblique surface 97 respectively and have the same shape.

The upper cap 81 includes a plate 85 and at least one support member supporting the plate 85. The lower cap 83 also includes a plate and a support member.

Accordingly, the fluid rising from the lower side of the reaction unit body 96 is introduced into a side of the lower cap 83 and, after rising through a hole 37 of the oblique surface 97, makes contact with the plate 85 of the upper cap 81 to flow to a side of the upper cap 81.

As a result, the fluid is agitated in the process of passing through the upper and lower caps 81 and 83 to increase treatment efficiency.

Moreover, the lower frame 21 (refer to FIG. 2) is omitted in the reaction unit body 96, and a leg L is mounted to the reaction unit body 96 instead.

Figure 10:
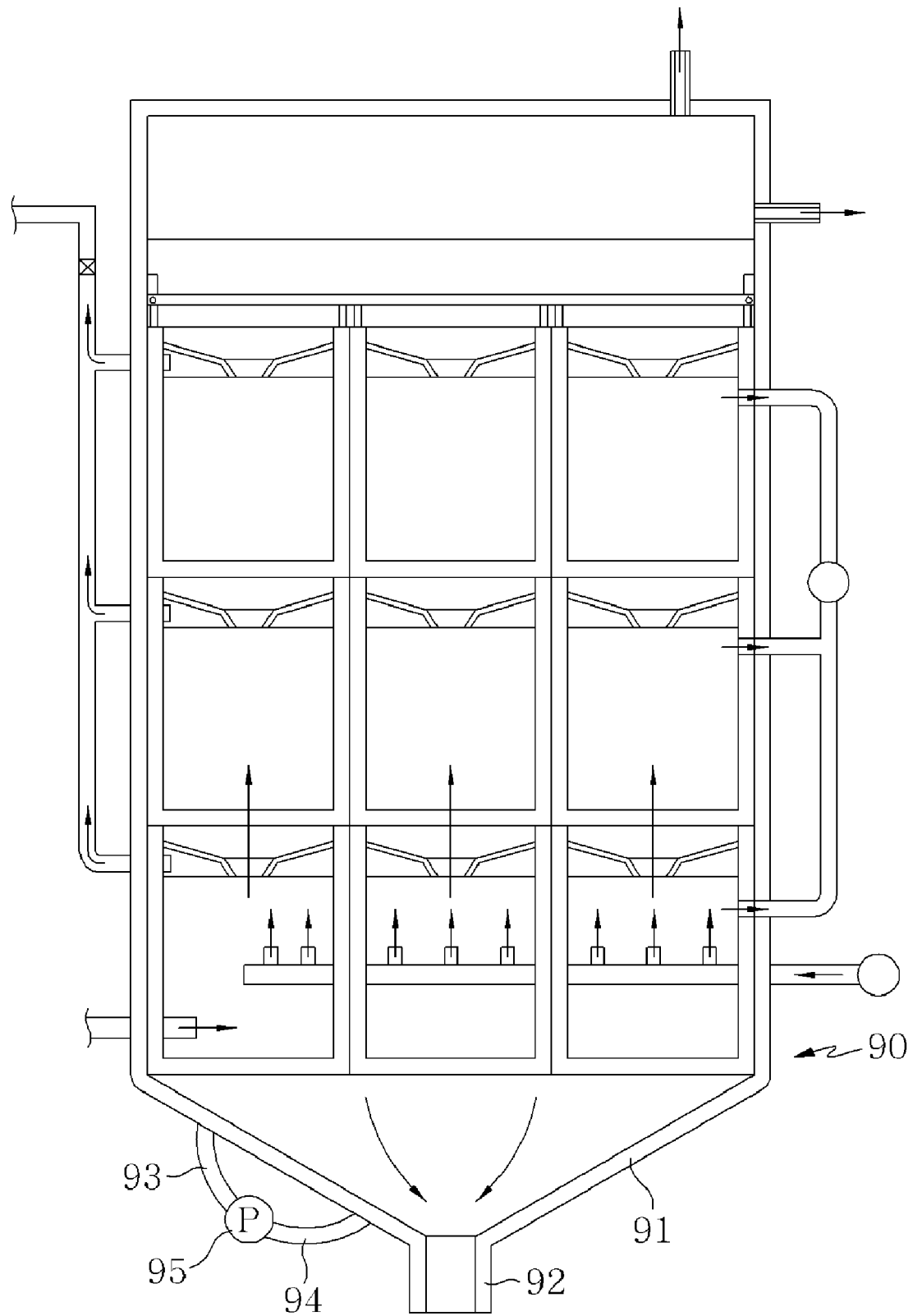
FIG. 10 is a partial view illustrating a hopper unit installed at a lower portion of the reactor illustrated in FIG. 1.

As illustrated in FIG. 10, a hopper may be formed at a lower portion of the reactor 90. In other words, the hopper 91 is formed by inclining a lower portion of the reactor by a specific angle, and an outlet tube 92 is provided at a lower portion of the hopper 91.

Accordingly, the substances deposited at a lower portion of the reactor 90 flow downward along the inclined portion of the hopper 91 to be discharged outside through the outlet tube 92.

Agitation units 93, 94, and 95 may be additionally mounted to the hopper 91 of the reactor. Each agitation unit 93, 94, and 95 includes a first pipe body 93 connected to the upper side of the hopper 91, a second pipe body 94 connected to the lower side of the hopper 91, and a pump 95 connected to the first and second pipe bodies 93 and 94 to pump fluid.

Accordingly, the fluid stored in the hopper 91 may be circulated through the first and second pipe bodies 93 and 93 to be agitated by driving the pump 95.

Referring to FIGS. 2 to 4 again, coupling bosses 31 protrude from the upper frame 22. The coupling bosses 31 protrude by a predetermined length from the upper surface of the upper frame 23 at the corners of the upper frames 23. Coupling recesses 33 are formed on the bottom surface of the lower frame 21 at the corners of the lower frame 21.

Accordingly, the coupling bosses 31 of a reaction unit body 5 disposed on the lower side are inserted into the coupling recesses 33 of a reaction unit body 5 disposed on the upper side, so that plural reaction unit bodies 5 are coupled to each other.

Then, friction members made of rubber or a synthetic resin are attached to the coupling recesses 33 respectively, whereby when the coupling bosses 31 are inserted into the coupling recesses 33, the reaction unit bodies 5 are supported by frictional forces to be prevented from floating due to the buoyancy.

Transfer holes h are formed in the upper and lower frames 23 and 21 at locations similar to that of the lower end of the fluid flow tube 29. Accordingly, the bubbles and water flowing from the lower end to the upper end of the reaction unit body 5 are divided at the lower limit line of the fluid flow tube 29.

Then, the water flows downward together with some bubbles, and some gas flows through the holes h according to the gas pressure, amount of gas, and distribution of gas in an adjacent reaction unit body 5. A support connecting the upper and lower communication holes h may induce growth and attachment of microorganisms.

Then, the liquid flows downward and is mixed to maximize the mixing effect, and the gas uniformly flows to the adjacent reaction unit body 5 to induce a reaction unit body in which gas is stayed or is sufficient.

Accordingly, the force applied to the reaction unit bodies 5 by the buoyancy of gas helps mix the fluids, thereby maximizing the mixing effect, i.e. the purpose of the present plant and minimizing the influence of irregular waves or vibration obstructing the stability of the plant.

As mentioned above, treating water by stacking reaction unit bodies 5 enables mass-production of the reaction unit bodies 5 by a molding method.

Then, the reaction unit bodies 5 may be separately formed and manufactured and then be assembled together for the convenience of work.

As illustrated in FIG. 1, a fixing bar 80 is provided at the upper most end of the reaction unit bodies 5 to press the reaction unit bodies 5, thereby preventing the reaction unit bodies 5 from rising due to the buoyancy.

One end of the fixing bar 80 is hingedly connected to a fixing bracket 84 provided on one side of the reactor 3 therein, and the other end thereof is connected to a locking bracket 82 provided on the other side of the reactor 3 therein.

Accordingly, the fixing bar 80 is hingedly fixed by the fixing bracket when it is fixed to the locking bracket 82 by fixing pins 86 to press the reaction unit bodies 5, thereby preventing the reaction unit bodies 5 from rising due to the buoyancy.

A manhole (not shown) may be installed at an intermediate portion of the reactor 3 for cleaning.

A circulation unit for circulating gas and wastewater upward and downward is mounted to one side of the reactor 3.

The circulation unit 60 includes a pipe 62, a pump P2 provided in the pipe 62, an upper pipe 64 protruding from the pipe 62 and connected to an upper space of the reactor 3, an intermediate pipe 65 connected to an intermediate space of the reactor 3, and a lower pipe 66 connected to a lower space of the reactor 3.

Accordingly, the wastewater and gas in the reactor 3 may be circulated by driving the pump P2. Then, valves are attached to the upper pipe 64, the intermediate pipe 65, and the lower pipe 65 to selectively circulate the wastewater and gas between the upper to lower side of the reactor 3.

The circulation is performed with injection of the gas being stopped and is periodically performed, whereby the nitrogen in the sludge deposited in the sludge separation units is removed.

On the other hand, a gas discharge unit 70 is provided on the other side of the reactor 3, whereby the gas collected in the sludge separation units is discharged outside.

The gas discharge unit 70 includes a main pipe 72 through which gas can flow, and auxiliary pipes 74a, 74b, and 74c protruding from the main pipe 72 and entering the reactor 3 to be communicated with the gas hold-up spaces Va, Vb, and Vc of t the sludge separation units S1, S2, and S3.

The auxiliary pipes 74a, 74b, and 74c are communicated with the gas hold-up spaces Va, Vb, and Vc of the sludge separation units S1, S2, and S3, whereby the collected gas flows to the auxiliary pipes 74a, 74b, and 74c and is discharged outside through the main pipe 72.

Accordingly, the gas discharge unit 70 discharges the gas inside the reactor 3 outside to be used in a non-oxidation reaction such as denitrification.

The wastewater treated by aeration and denitrification is discharged through an outlet pipe.

Figure 5:
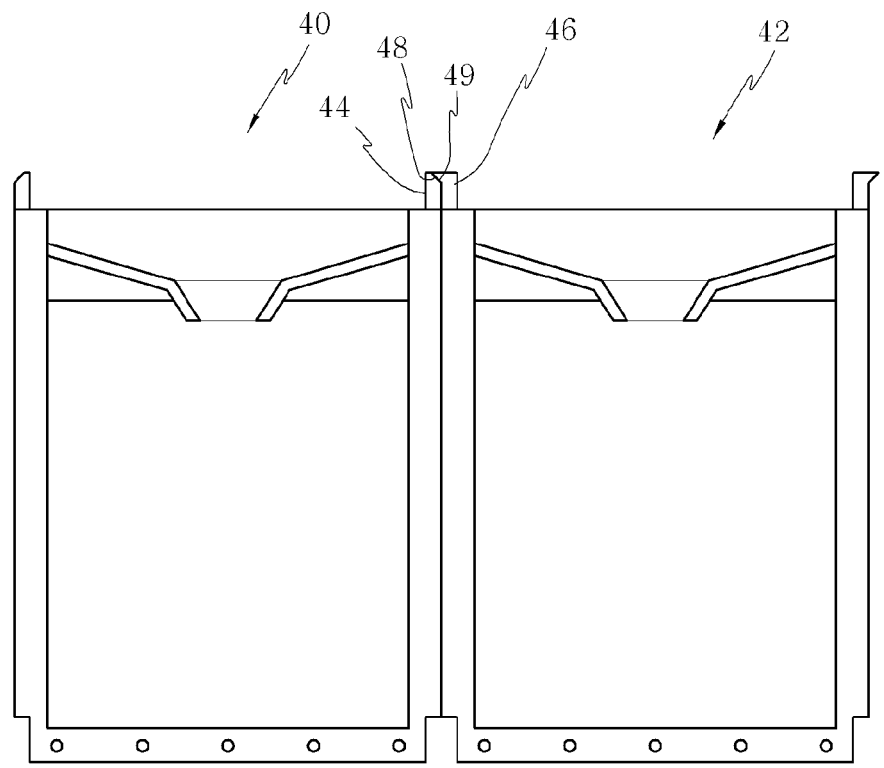
FIG. 5 is a side view illustrating a coupling structure of the reaction unit body illustrated in FIG. 1.

FIG. 5 illustrates a coupling structure of a reaction unit body according to the embodiment of the present invention. As illustrated, when the reaction unit bodies are disposed, adjacent reaction unit bodies 42 are coupled to each other to be disposed more stably.

In other words, a coupling boss 44 protrudes from an upper portion of one reaction unit body 40. An oblique surface 48 is formed on one side of the first coupling boss 44. A second coupling boss 46 protrudes from an upper portion of the other reaction unit body 42. A catching jaw 49 is formed on one side of the first coupling boss 44. Then, the angle of the catching jaw 49 and the oblique surface are the same.

Accordingly, the reaction unit bodies 40 and 42 are transversely coupled to each other, and the catching jaw 49 of the second coupling boss 46 makes contact with the oblique angle 48 to be firmly coupled to the oblique angle 48.

In this way, the reaction unit bodies 40 and 42 are firmly coupled to each other, whereby when the wastewater and gas rise or lower between the reaction unit bodies 40 and 42, the reaction unit bodies 40 and 42 are prevented from rising due to the buoyancy.

Figure 6:
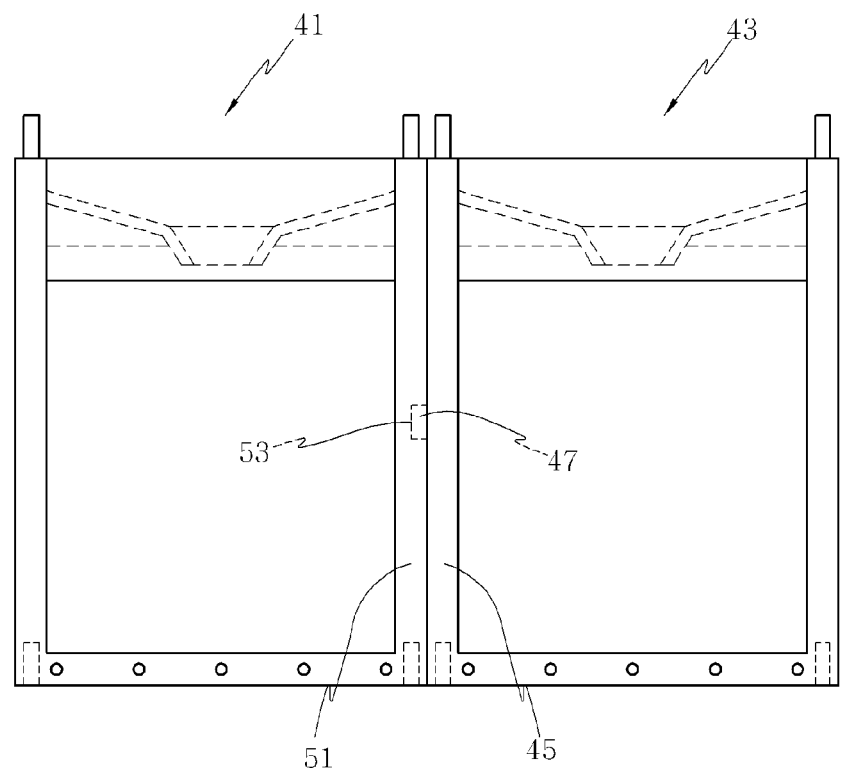
FIG. 6 is a side view illustrating another coupling structure of the reaction unit body illustrated in FIG. 1.

The coupling structure of the reaction unit bodies may be as illustrated in FIG. 6. In other words, an insertion recess 53 is formed at the connection frame 51 of the reaction unit body 41, and an insertion boss 47 protrudes from the connection frame 45 of the reaction unit body 43.

Accordingly, the insertion boss 47 of the reaction unit body 43 is inserted into the insertion recess 53 of the reaction unit body 41 to couple the reaction unit bodies 41 and 43 to each other.

Figure 11:
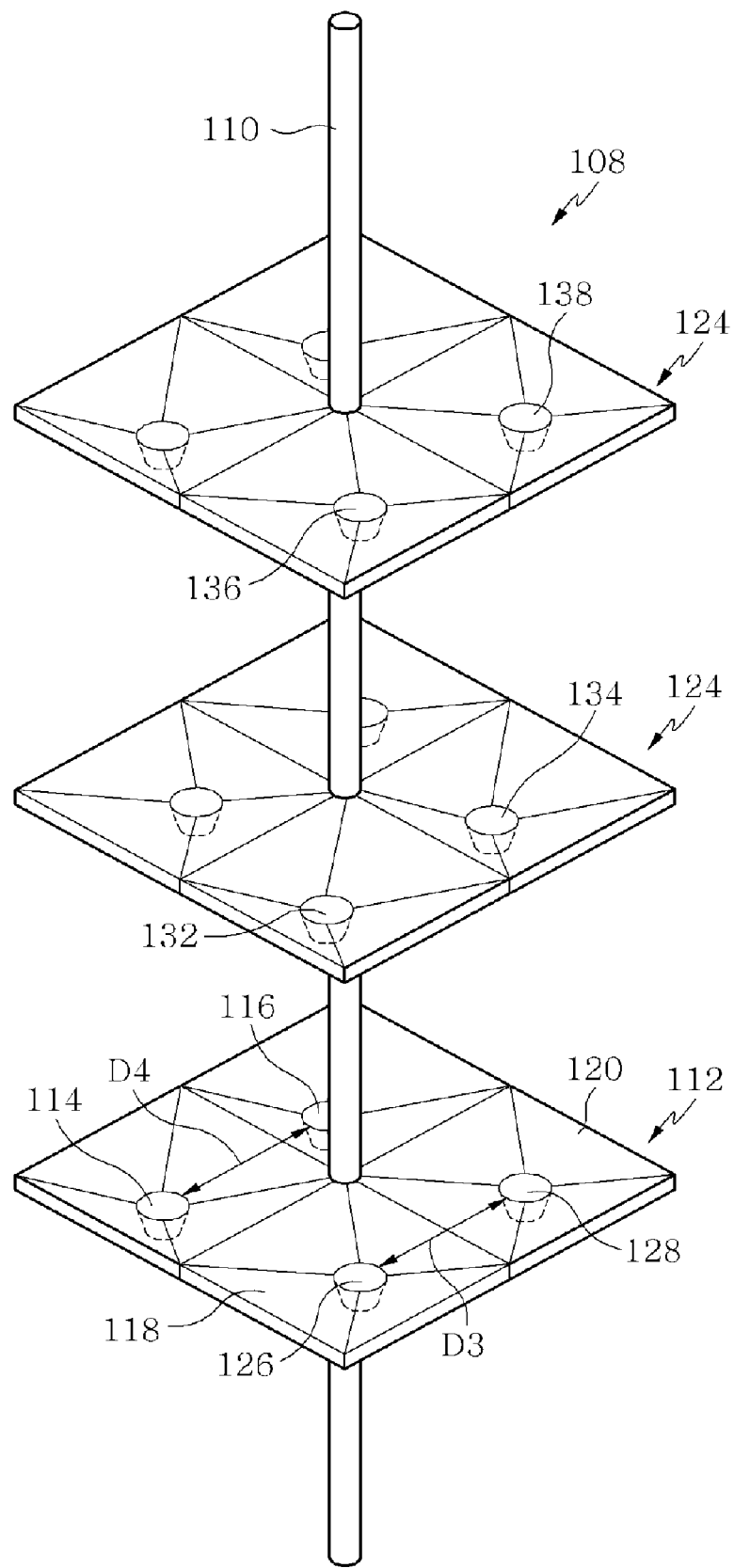
FIG. 11 is a perspective view illustrating a reaction unit body according to another embodiment of the present invention.
Figure 12:
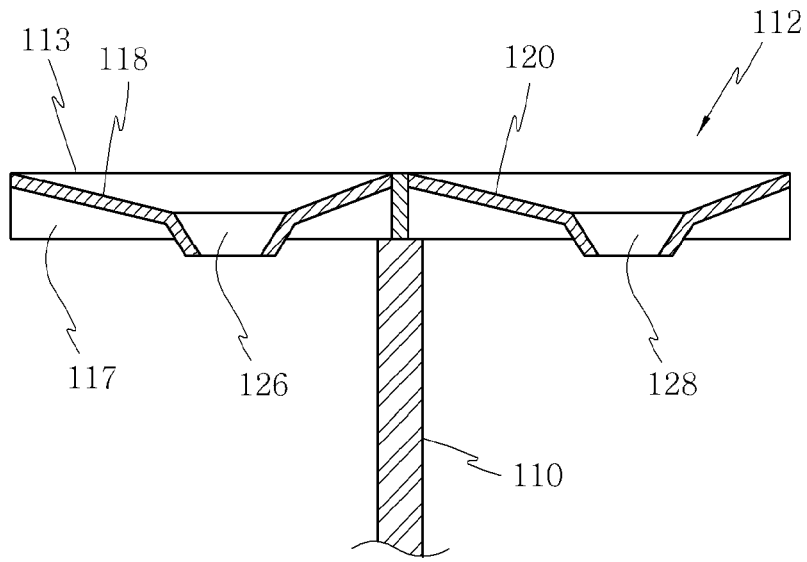
FIG. 12 is a sectional view of the reaction unit body illustrated in FIG. 11.

FIGS. 11 and 12 illustrate a reaction unit body according to another embodiment of the present invention. As illustrated, the reaction unit body 112 according to the embodiment of the present invention includes a plate 113, a support member 110 protruding to a lower portion of the plate 113 and connected to another reaction unit body, and a plurality of fluid flow pipes 126, 128, 114, and 116 provided in the plate 113 and functioning as an upward and downward passage for fluid.

In the reaction unit body, the plate 113 has a predetermined area to interrupt upward and downward movement of fluid.

Four oblique plates 118, 119, 120, and 121 are integrally formed in the plate 113. In other words, four fluid flow pipes 126, 128, 114, and 116 are provided in one plate 113 to improve treatment efficiency.

The four oblique plates 118, 119, 120, and 121 are inclined toward the centers thereof by a predetermined angle. Accordingly, when sludge is deposited on the upper surface of the plate 113, the sludge flows downward along the oblique plate 118 to be prevented from being stacked.

The four oblique plates 118, 119, 120, and 121 have the same shape, but only the locations of the fluid flow pipes 114, 116, 126, and 128 are different.

In other words, the fluid flow pipes 114, 116, 126, and 128 maintain different intervals. For example, the interval D3 between the first fluid flow pipe 126 and the second fluid flow pipe 128 and the interval D4 between the third fluid flow pipe 114 and the fourth fluid flow pipe 116 are different.

When the intervals D3 and D4 of the fluid flow pipes 114, 116, 126, and 128 are different from each other when the reaction unit bodies 112, 122, and 124 are stacked, the reaction unit bodies 112, 122, and 124 are rotated by 90 degrees about the support member 110 when they are assembled.

In other words, the second-stage reaction unit body 122 having the same transverse and longitudinal lengths is rotated by 90 degrees about the first-stage reaction unit body 112 when it is stacked, and the third-stage reaction unit body 124 is rotated by 90 degrees about the second-stage sludge unit assembly 122 when it is stacked.

As a result, the fluid flow pipes 126 and 128 of the first-stage reaction unit body 122 are deviated from the fluid flow pipes 132 and 134 of the second-staged reaction unit body 122, and the fluid flow pipes 136 and 138 of the third-stage reaction unit body 124 are deviated from the fluid flow pipes 132 and 134 of the second-stage reaction unit body 122.

Accordingly, the fluid flow pipes 126, 128, 114, 116, 132, 134, 136, and 138 of the reaction unit bodies 112, 122, and 124 are deviated from each other to increase the agitation effect of the fluid passing through them.

The reinforcing member 117 is disposed on the bottom surface of the plate 113 to support the plate 113. The reinforcing member 117 has a jaw-like shape protruding downward from the bottom surface of the plate 113 by a predetermined height and is transversely and longitudinally disposed about the fluid flow pipe 126.

Figure 13:
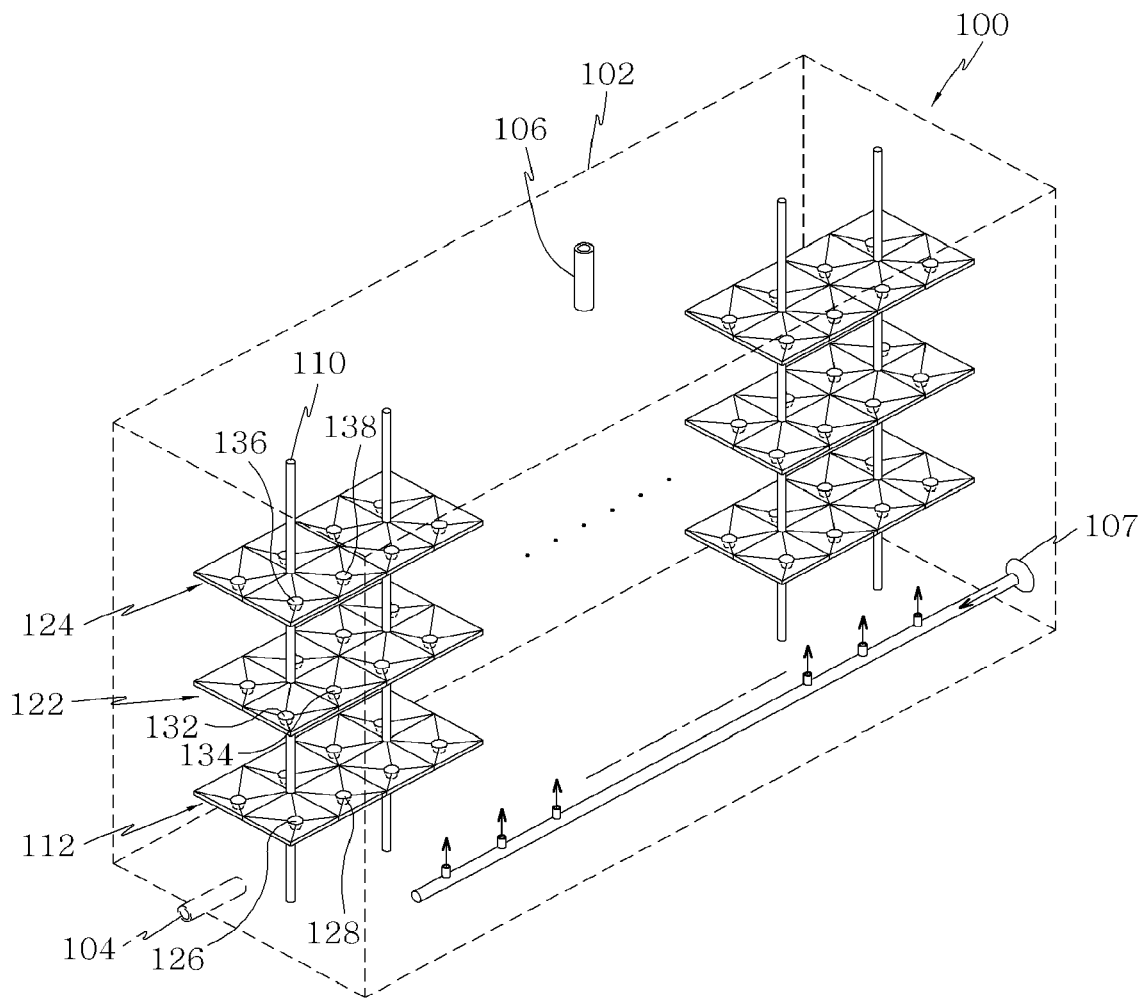
FIG. 13 is a perspective view illustrating the reaction unit body of FIG. 11 that is disposed inside the reactor.
Figure 14:
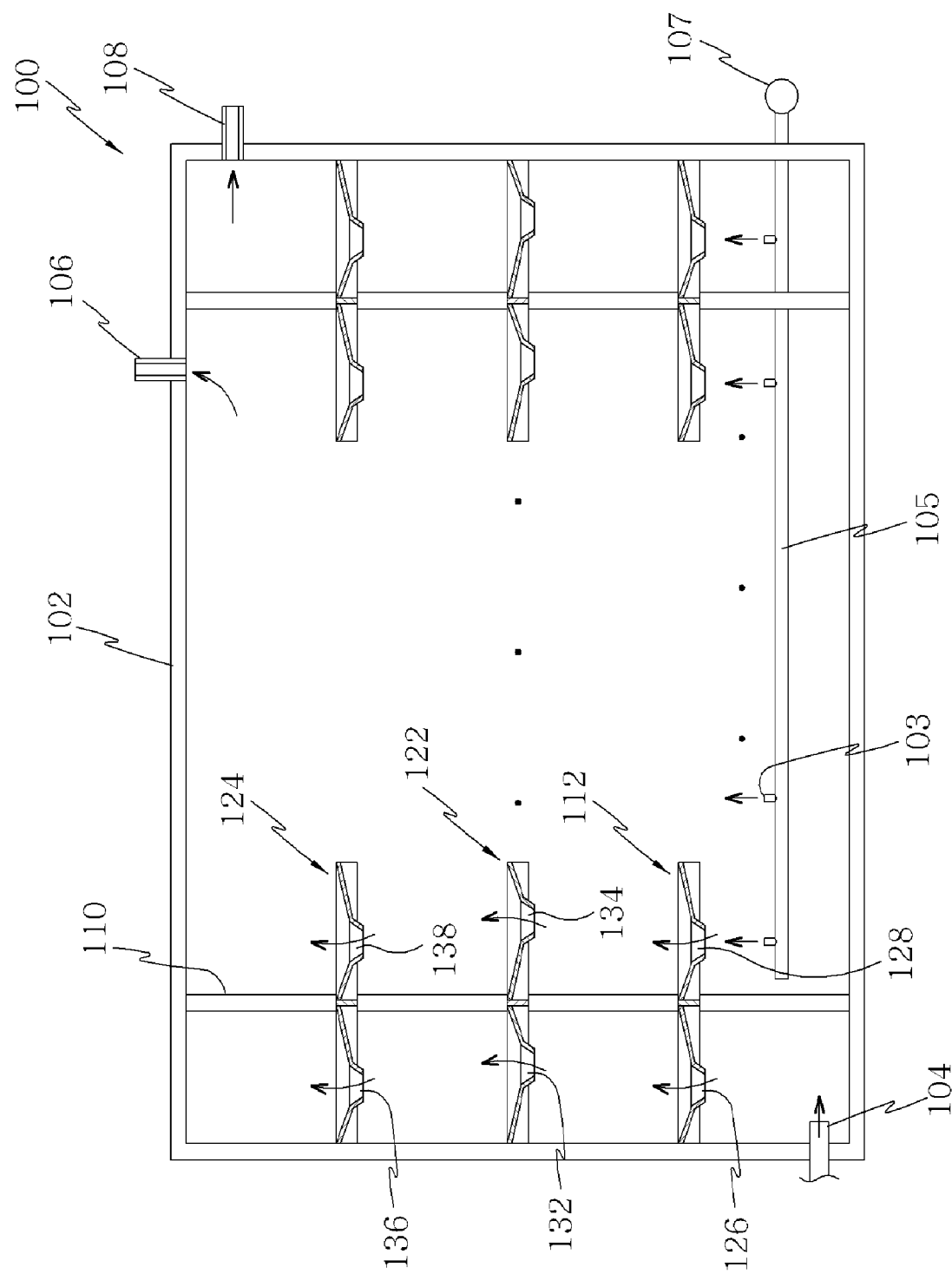
FIG. 14 is a side view of FIG. 13.

FIGS. 13 and 14 illustrate a water treatment plant 100 including a reactor 102 having stacked reaction unit bodies 112, 122, and 124.

As illustrated, plural reaction unit bodies 112, 122, and 124 are stacked inside the reactor 102, and a bubbling unit 107 is provided at a lower portion of the reactor 102. A wastewater inlet pipe 104 is provided on one side of a lower portion of the reactor 102 to introduce the wastewater into the reactor 102.

The gas outlet 106 and the treated water outlet 108 are provided at upper portions of the reactor 102.

Accordingly, when plural reaction unit bodies 112, 122, and 124 are stacked inside the reactor 102, the reaction unit bodies 112, 122, and 124 make contact with each other to maintain the plate transversely connected, in which case the wastewater may be interrupted by the plate 113 when it flows upward and downward through the fluid flow pipe 118.

Hereinafter, a process of treating wastewater by the water treatment plant 100 will be described in detail.

The wastewater to be treated is introduced into the reactor 102 through the wastewater inlet pipe 104, and external gas is introduced into the reactor 102 through the aeration unit 107.

The gas injected into the aeration unit 107 may be injected through the supply pipe 105 and the nozzles 103 to effectively perform a bubbling process.

As mentioned above, the wastewater and gas introduced into the reactor 102 rises to reach the first reaction unit body 112.

The wastewater that has reached the first reaction unit body 112 rises to an upper space through the fluid flow pipes 126, 128, 114, and 116.

The wastewater and gas that have passed through the first reaction unit body 112 reaches the second reaction unit body 122. In the process of passing through the second reaction unit body 122, materials may be separated through the same process as that of the first reaction unit body 112.

The wastewater and gas that have reached the uppermost space of the reactor 102 is discharged through the gas outlet 106 and the treatment water outlet 108.

Figure 15:
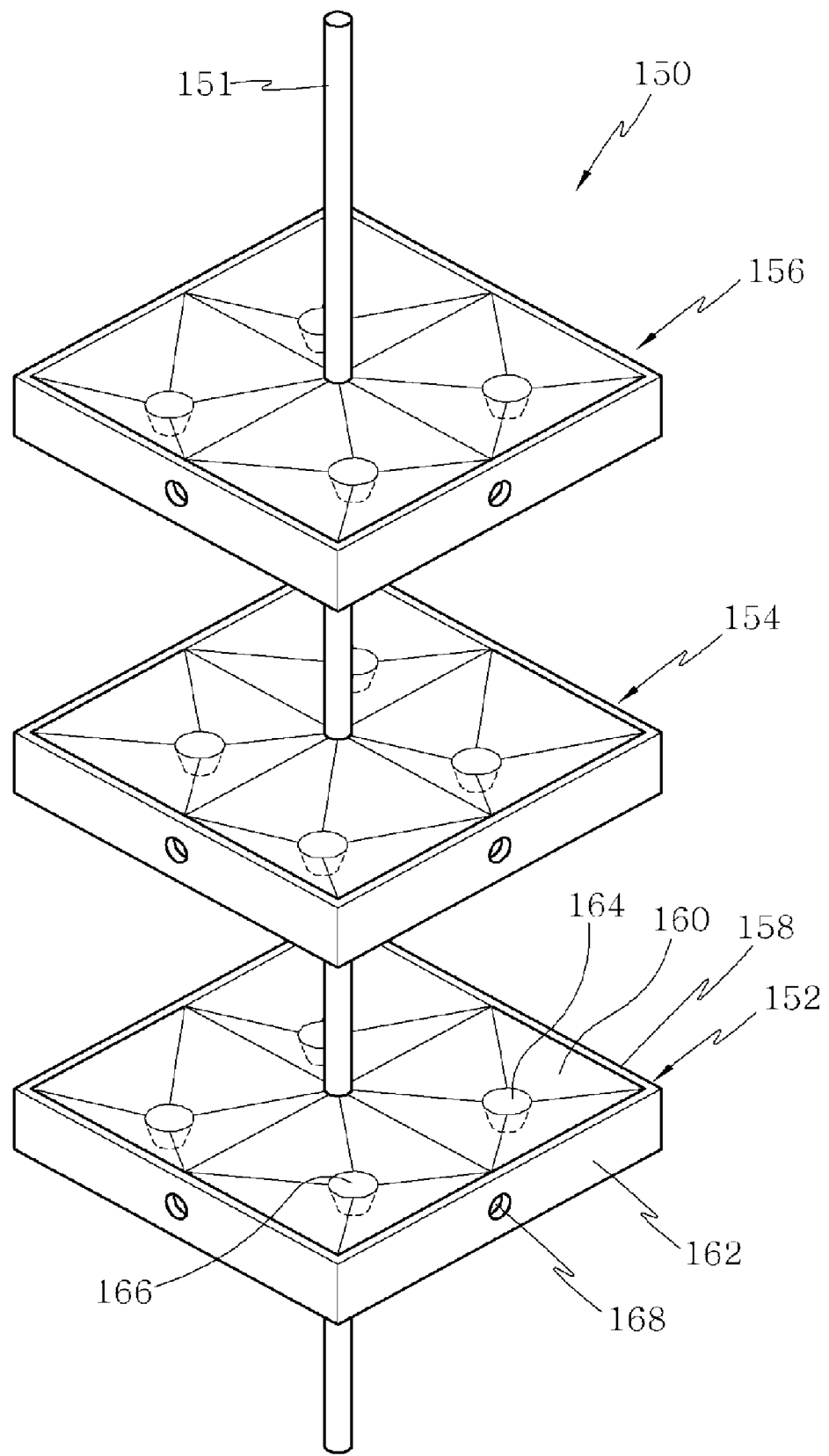
FIG. 15 is a perspective view illustrating a reaction unit body according to another embodiment of the present invention.
Figure 16:
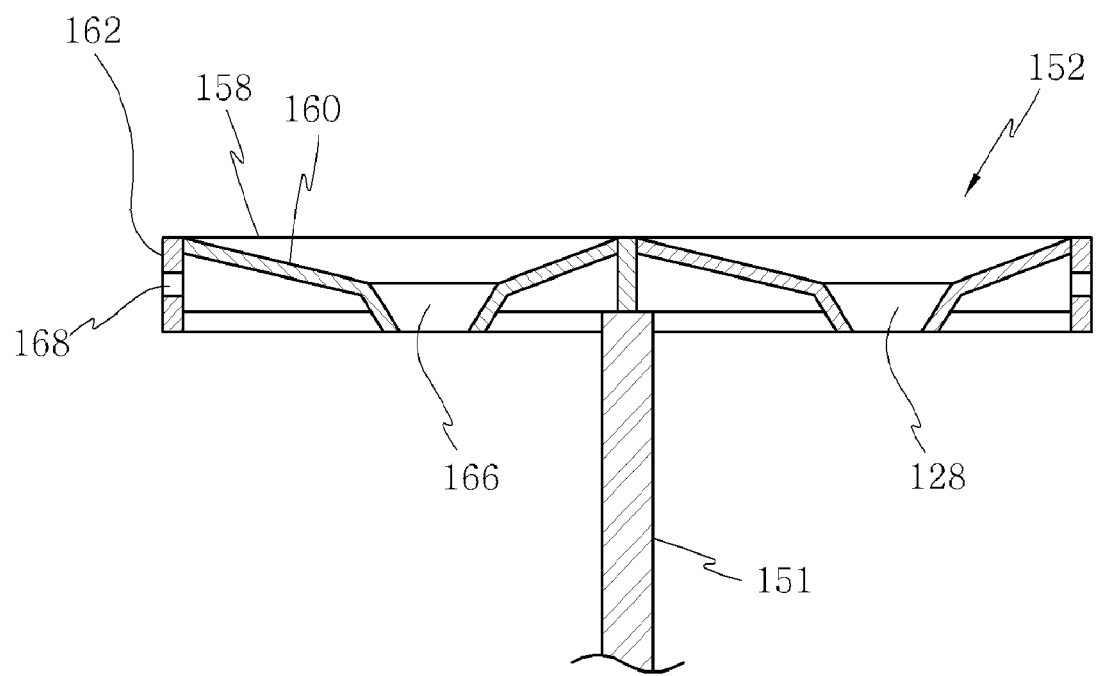
FIG. 16 is a sectional view of the reaction unit body of FIG. 15.

FIGS. 15 and 16 illustrate a reaction unit body according to another embodiment of the present invention. As illustrated, the reaction unit body 150 according to the embodiment of the present invention has a peripheral portion 162 on a side surface of the plate 158.

The peripheral portion 162 of the plate 158 is formed to flow fluid upward and downward inside the peripheral portion 162, whereby almost all forces generated by the buoyancy force of gas maximizes the upward and downward flow effect. Further, horizontal flow of the fluid may be prevented by adjusting the right and left forces of the fluid.

The horizontal flow of the fluid hampers recirculation of bubbles in the reactor and causes a stability problem of the reactor due to the vibration.

In particular, the reaction unit body having the peripheral portion 162 is applied to a large-sized treatment facility to reduce the overall vibration problem.

More particularly, the reaction unit body 152 according to the embodiment of the present invention includes a plate 158, a support member 151 protruding to a lower portion of the plate 158 and connected to another reaction unit body, a plurality of fluid flow pipes 164 and 166 provided in the plate 158 to function as an upward and downward passage of fluid, and a peripheral portion 162 protruding downward from the periphery of the plate 158.

The shapes of the plate 158, the oblique surface 160, the fluid flow pipes 164 and 166, and the support member 151 are the same as those of the reaction unit body illustrated in the above-mentioned embodiment of the present invention, and the detailed description thereof will be omitted.

The peripheral portions 162 protrude downward from the periphery of the plate 158 by a predetermined distance. The peripheral portions 162 are formed at the periphery of the plate 158 to form a space at a lower portion of the plate 158.

Accordingly, wastewater and air are stored in the space to be prevented from flowing right and left.

Holes 168 are formed at the peripheral portions 162. The holes 168 are formed in the four peripheral portions 162. Accordingly, the pressure of the wastewater stored in a lower space of the plate 158 is prevented from being concentrated in the peripheral portions 162.

Hereinafter, a water treatment method according to an embodiment of the present invention will be described in detail with reference to the accompanying drawings.

Figure 17:
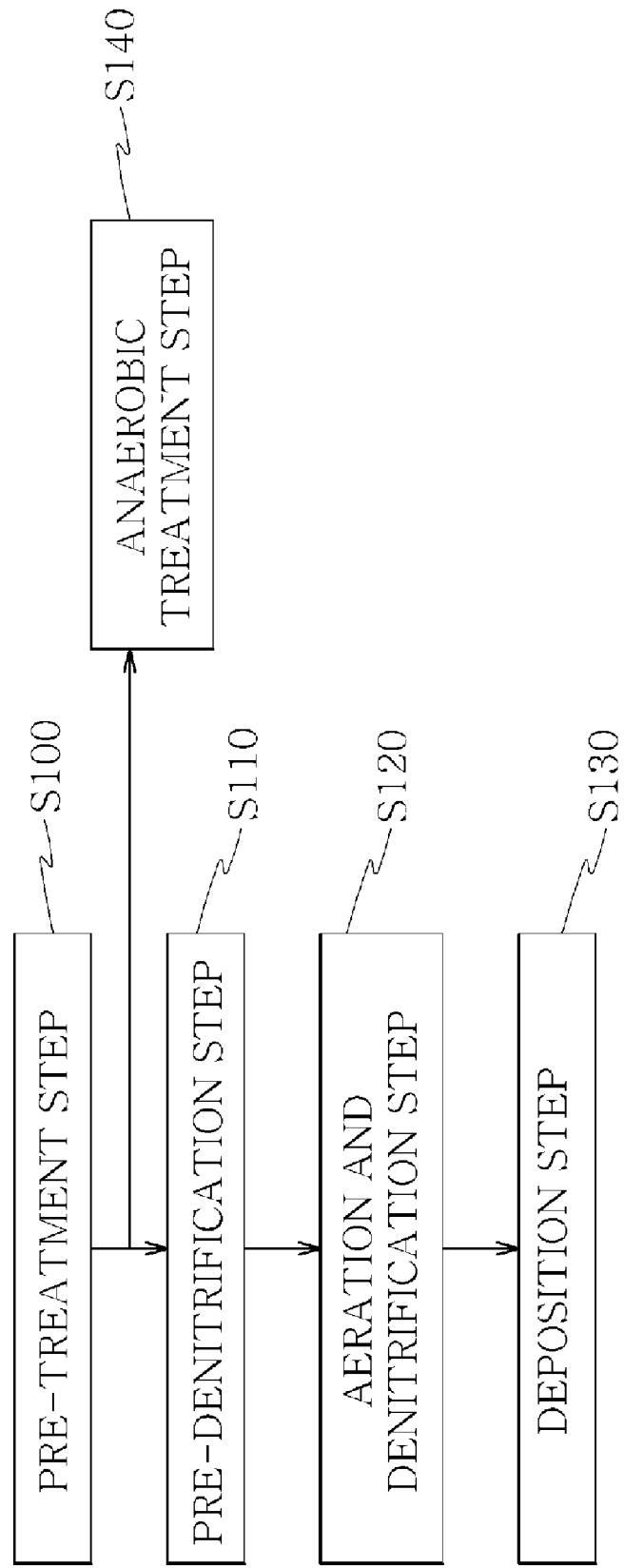
FIG. 17 is a flowchart illustrating a water treatment method according to an embodiment of the present invention.

As illustrated in FIGS. 1, 2, and 17, the water treatment method according to the embodiment of the present invention includes a pre-treatment step S100 of removing solids in introduced water and crushing the solid materials using a crusher, a aeration and denitrification step S120 of injecting air and oxidizing organic materials and nitrogen through an aerobic process, and a step S130 of aerobically treating the introduced water, precipitating sludge through solid-liquid separation, and returning some sludge to the reactor (aeration and denitrification vessel).

In the water treatment method, the pre-treatment step S100 is performed in a general manner. In other words, wastewater passes through the crusher to remove solid materials contained therein, whereby the solid materials contained in the wastewater are crushed and miniaturized.

After the pre-treatment step S100 is completed, the aeration and denitrification step S120 is performed.

In the aeration and denitrification step S120, the wastewater to be treated is introduced into the reactor 3 through the wastewater inlet pipe 13, and external air is introduced into the reactor 3 through the bubbling unit 7.

The gas injected into the bubbling unit 7 is uniformly injected through a plurality of nozzles 19 to effectively perform the aeration process.

As mentioned above, the wastewater and gas introduced into the reactor 3 rises to reach the first sludge separation unit S1.

The multi-stage sludge separation units S1, S2, and S3 disposed inside the reactor 3 may be created by stacking the reaction unit bodies 5.

In other words, the coupling bosses 31 of the lower reaction unit body 5 are inserted into the coupling recesses 33 of the upper reaction unit body 5 to stack the reaction unit bodies 5.

Through the process, the multi-stage sludge separation units S1, S2, and S3 are formed by stacking the reaction unit bodies 5.

The wastewater that has reached the first sludge separation unit S1 rises to an upper space through the fluid flow pipes 29 provided in the reaction unit bodies 5 and the gas rises by buoyancy to be collected in the gas hold-up space formed at a lower portion of the oblique plate 27.

Then, the gas hold-up space Va is expanded downward to form a water surface at the lower limit line of the fluid flow pipe 29. Accordingly, the gas may be collected at the upper space above the water surface.

When the lengths of the fluid flow pipes 29 are different, gas gradually rises so that the first water surface L1 is formed at the lower limit line of the longest fluid flow pipe 29.

When the gas additionally rises, some rises through the shortest fluid flow pipe 54. Then, some gas that has not passed through the shortest fluid flow pipe 54 is gradually collected to press the first water surface L1 downward to form the second water surface L2.

Further, the gas in the gas hold-up space Va formed above the second water surface L2 flows upward through the longest fluid flow pipe 56.

In the process, the water surfaces are changed due to movement of the first water surface L1 and the second water surface L2 to increase the fluidity of the fluid.

Then, in the longest fluid flow pipe 56, the interval between the second water surface L2 and a fluid flow pipe is so short that the resistance of gas becomes smaller, whereby almost all sludge flowing upward and downward flows downward through the largest fluid flow pipe 56.

Gas rarely or occasionally flows at the upper end of the longest fluid flow pipe 56, whereby sludge of substantially high density is collected there and may selectively flow downward.

Maintenance of the high density of slurry at the lower end of the long fluid flow pipe 56 is a very important factor in reducing the amount of transferred slurry and increasing treatment rate.

Almost all the bubbles generated in the reactor 3 due to the structural characteristics of the fluid flow pipes 29 stays at the upper end of the wastewater and materials of relatively low density are mainly stayed on the surface of the wastewater due to the surface tension.

Accordingly, the materials of low density are located at upper portions of the stages, whereby the densities of the materials become lower as they go toward the upper end of the reactor 3.

The amount and pressure of the gas introduced from the lower side are maintained above predetermined values to uniformly discharge the gas through the fluid flow pipes 29.

The wastewater and gas that have passed through the first sludge separation unit S1 reaches the second sludge separation unit S2 through the process. Materials may be separated through the second sludge separation unit S2 that is the same as the first sludge separation unit S1.

The wastewater and gas that have reached the uppermost space of the reactor 3 are discharged through the gas outlet 9 and the treated water outlet 11.

In the bubbling and denitrification process, denitrification may be attempted by exhausting gas by the gas discharge unit when management of a non-oxygen vessel is needed.

In other words, after the aeration process, the gas existing inside the reactor needs to be removed for denitrification. To achieve this, the residual gas and some bubbles that have been collected in the gas hold-up spaces Va, Vb, and Vc of the sludge separation units S1, S2, and S3 are discharged through the auxiliary pipes 74a, 74b, and 74c by opening the valve 76 of the main pipe 72 of the discharge unit 70.

Then, the pipes 74a, 74b, and 74c need to be spaced apart from the upper end wall of the reactor 3 to prevent the discharged gas from flowing upward by buoyancy.

If the valve 76 is opened, the gas and some bubbles at the stages are discharged outside to the initial position through the auxiliary pipes 74a, 74b, and 74c and the main pipe 72.

Accordingly, a non-oxygen vessel may be managed through the gas discharge process after the denitrification process.

After deposits are condensed in the sludge separation units after the reactor 3 is driven for a predetermined time period, a deposition step S130 is performed.

In the deposition step S130, it is necessary to increase the condensation efficiency of the lower end of the reactor 3 and the denitrification efficiency by periodically flowing the deposits to the lowermost end of the reactor 3 through the circulation unit 60. In other words, when the pump P2 of the circulation unit 60 is operated, the deposits condensed at the stages are sucked through the upper, intermediate, and lower pipes 64, 65, and 66 by pressure.

The sucked deposits are introduced into a separate unit or the inlet pipe 15 of the bubbling unit 17 through the pipe 62 to be supplied to an arbitrary internal location of the reactor 3 and are circulated into the reactor 3 again.

Accordingly, during flow of the wastewater from upside to downside through the circulation process, unlike injection of gas, the wastewater itself flows to generate the concentration of sludge, and the condensation efficiency at the lower end of the reactor 3 may be increased and the difference between densities of the sludge at the upper and lower ends of the reactor 3 may be induced.

Denitrification is performed through the process, and the circulation may be performed from the uppermost end to lowermost end of the reactor 3 or from an intermediate portion to the uppermost end of the reactor 3.

As another embodiment of the present invention, an aerobic treatment step S140 may be performed after the pretreatment step S100. In other words, methane gas is injected instead of the gas inside the reactor 3, and the anaerobic treatment may be performed in the process of the methane gas and wastewater passing through the reaction unit bodies 5.

The water treatment efficiency by the water treatment plant having the stacked reaction unit bodies may be expressed as in Table 1.

In other words, considering load of food wastewater to be introduced and removal efficiency, the removal efficiency is 97% for the aerobic treatment, and 85% for the anaerobic treatment, which are considerably high water treatment efficiencies.

The treatment efficiency means the difference between organic materials before and after a water treatment, and is the difference between the amounts of dissolved organic materials for the aerobic treatment and is the difference between the decomposable total solid material and the discharged decomposable total solid material for the anaerobic treatment.

The gas generated after the anaerobic digestion of food shows more than $1.0\,m^3/kg\,VS$ for removed organic materials (vs).

TABLE 1

| Classification | Aerobic digestion | Anaerobic digestion |
| --- | --- | --- |
| 1. Introduction Load ($BOD_5\,kg/m^3d$) | 0.5-30 | 10-150 |
| 2. Oxygen transfer efficiency for substantial wastewater (%) | 15-35 (no perforational resistance) | — |
| 3. F/M corresponding to OUR | Lower end of reactor: 0.8-2 Upper end of reactor: 0.05-0.7 | — |
| 4. Treatment efficiency (%) | 97 | 85 |
| 5. Recycling of sludge | None (some is recycled for low concentration wastewater) | None |
| 6. Gas characteristics | Air | Methane (more than 70% purity, used for mixing) |
| 7. Approach degree of theoretical PFR (%) | More than 70 | More than 80 |

(The item 3 means the value of F/M calculated in consideration of OUR (Oxygen Uptake Rate))

Furthermore, by applying a plug flow reactor (PFR) method, in the case of the aerobic treatment, a large amount of dissolved oxygen, a large number of microorganisms, and a high concentration of original wastewater pollutants are secured at the lowermost end of the reactor and they become gradually reduced as they go to the upside of the reactor, thereby creating a typical reactor flow of a PFR. Further, in the case of the anaerobic treatment, high concentrations of organic materials and microorganisms are secured at the lowermost end of the reactor and their concentrations become lower. Therefore, a water treatment plant and a water treatment method of the present invention maintain a low pH at a lower portion of the reactor and a high pH at an upper portion of the reactor.

In other words, the growth expediting factors of microorganisms, i.e. organic materials, pH, dissolved oxygen, the number of microorganisms, oxygen, and organic acid simultaneously maintain flow of the PFR. Even when the PFR is operated in a downstream way according to the characteristics of the introduced water, a similar result may be induced.

Figure 18:
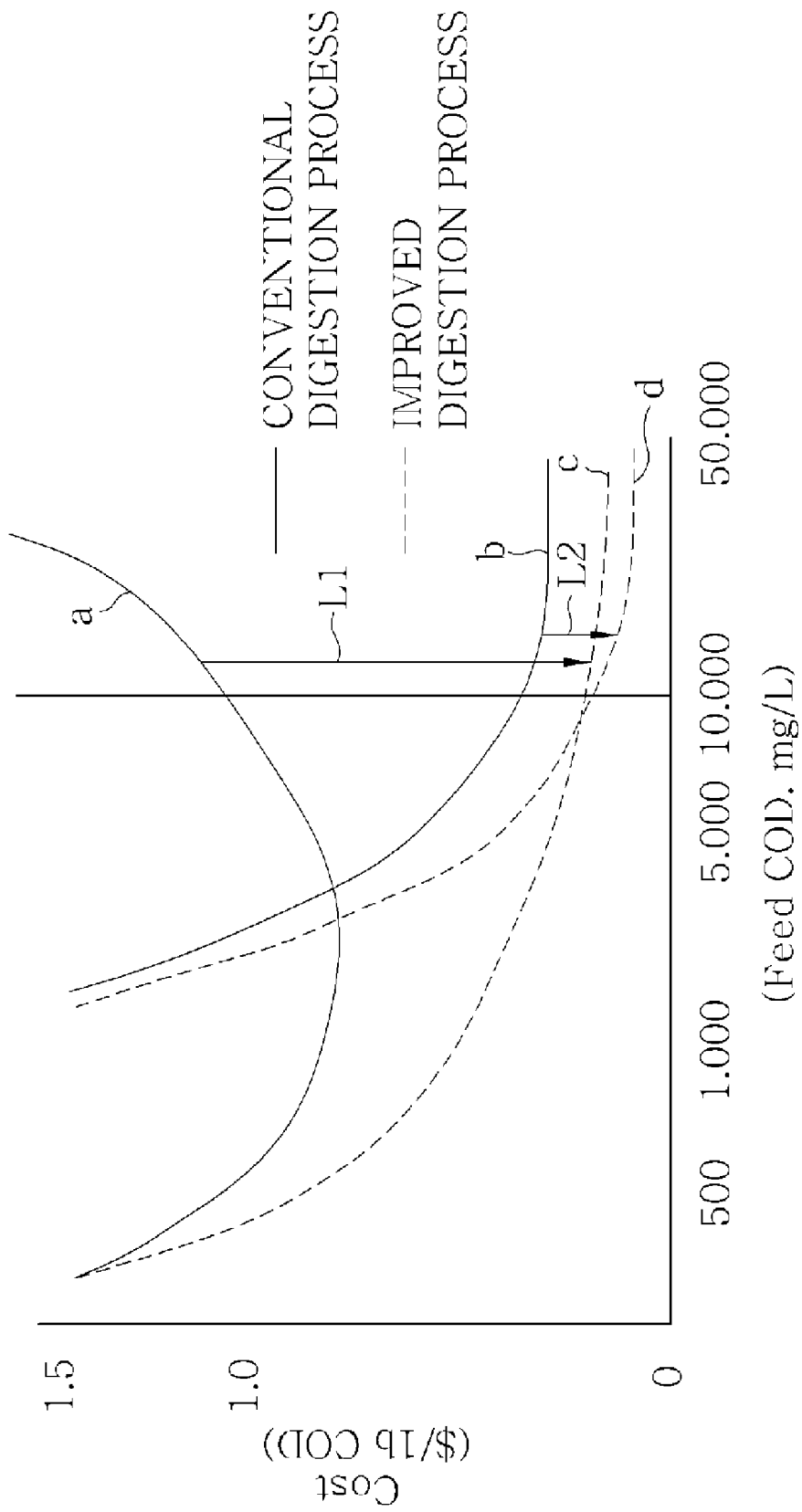
FIG. 18 is a graph illustrating results obtained by processing of the wastewater treatment plant according to the embodiment of the present invention in an aerobic condition and an anaerobic condition.
Figure 19:
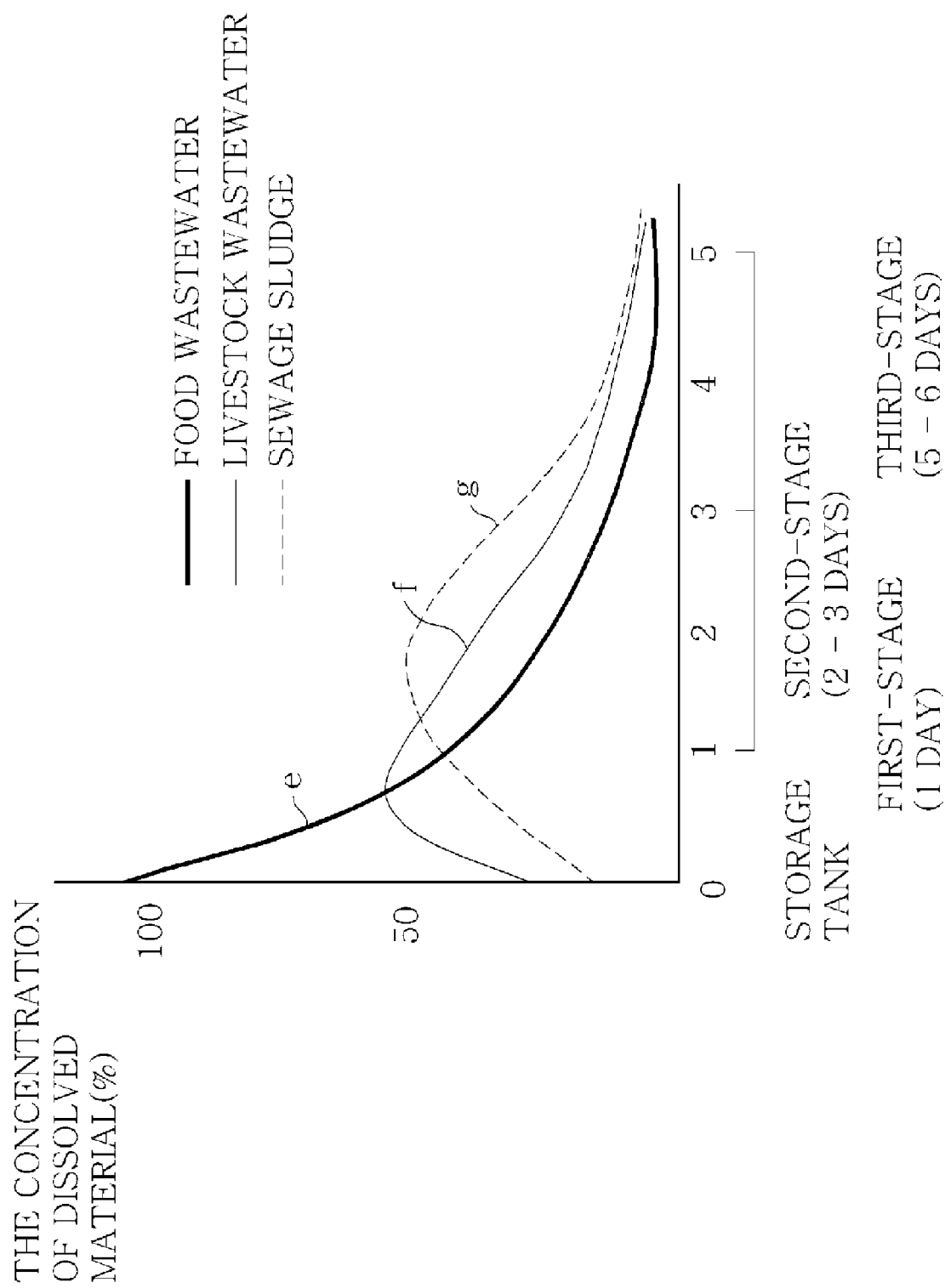
FIG. 19 is a graph illustrating results obtained by treating various wastewaters using the water treatment plant according to the embodiment of the present invention.

FIGS. 18 and 19 illustrate a result obtained by performing water treatment using the water treatment plant having the stacked reaction unit bodies.

As illustrated in FIG. 18, in the result obtained by performing an aerobic treatment using the reaction unit bodies, an arrow a showing a conventional digestion process is illustrated at an upper portion of the graph and an arrow c after the treatment is illustrated at a lower portion of the graph. In other words, the arrow is lowered by a predetermined distance L1 to show an improvement.

In the case of the anaerobic treatment, an arrow b showing a conventional digestion process is illustrated at an upper portion of the graph, and an arrow d after the treatment is illustrated at a lower portion of the graph. In other words, the arrow is lowered by a predetermined distance L1 to show an improvement.

As illustrated in FIG. 19, a result obtained by treating food wastewater, livestock wastewater, and sewage sludge using reaction unit bodies shows that the graph e of the food wastewater, the graph f of the livestock wastewater, and the graph g of the sewage sludge lower as time elapses, thereby improving treatment efficiency, for example, lowering the concentration of a dissolved material.

INDUSTRIAL APPLICABILITY

The present invention relates to a water treatment plant and a water treatment method, and more particularly, to a water treatment plant capable of efficiently treating strong organic wastewater by stacking plural reaction unit bodies and performing aerobic and anaerobic digestion treatments.

The invention claimed is:

1. A water treatment plant comprising:
   a reactor including a gas outlet, a treatment water outlet, and an inlet through which waste water and gas are supplied, through which the waste water is introduced, to perform bubbling and denitrification;
   a sludge separation means including a plurality of reaction unit bodies stacked vertically inside the reactor to divide the interior of the reactor into upper and lower sides and separating sludge in a bubbling process by forming a stay space for collecting the gas rising from a lower portion of the reactor; and
   a bubbling unit introducing gas into the reactor,
   wherein when the plurality of reaction unit bodies are disposed into the reactor, adjacent reaction unit bodies are coupled to each other.

2. The water treatment plant as claimed in claim 1, wherein the sludge separation means includes first to third sludge separation units stacked vertically inside the reactor, and the first to third sludge separation units include a plurality of reaction unit bodies respectively.

3. The water treatment plant as claimed in claim 1, wherein the reaction unit body includes upper and lower frames corresponding to each other, a connection frame connecting the upper and lower frames, an oblique surface provided inside the upper frame to divide the interior of the reactor into upper and lower sides and forming a gas stay space, and a fluid flow pipe provided on the oblique surface to function as upward and downward passages of fluid, and when the gas and waste water introduced into the reaction unit body rises to reach the oblique surface, a low density material in the gas is collected in the stay space and a high density material in the waste water stays at a lower portion of the reaction unit body, so that the low density material existing near a water surface flows upward first.

4. The water treatment plant as claimed in claim 3, wherein coupling bosses protrude from upper portions of the upper frame and coupling recesses are formed in the lower frame, so that when the reaction unit bodies are stacked, the coupling bosses at the lower end of the upper reaction unit body are coupled to the coupling recesses of the upper end of the lower reaction unit bodies.

5. The water treatment plant as claimed in claim 4, wherein friction members are provided in the coupling recesses of the lower frame.

6. The water treatment plant as claimed in claim 3, wherein a plurality of reinforcing members are disposed on the oblique surface.

7. The water treatment plant as claimed in claim 3, wherein the fluid flow pipes provided in the reaction unit bodies have different lengths.

8. The water treatment plant as claimed in claim 3, wherein a first reaction unit body includes coupling bosses having oblique surfaces and a second reaction unit body includes bosses protruding sideward and includes coupling bosses making contact with the oblique surface of the first reaction unit body.

9. The water treatment plant as claimed in claim 3, wherein insertion recesses are formed in the connection frame of a first reaction unit body and insertion bosses protrude from the connection frame of a second reaction unit body, so that the insertion bosses are coupled to the insertion recesses.

10. The water treatment plant as claimed in claim 3, wherein the fluid flow pipe has a funnel-like shape or a conical shape whose upper area is wider than the lower area thereof.

11. The water treatment plant as claimed in claim 1, wherein the reaction unit body includes an upper frame, an oblique plate provided inside the upper frame, a fluid flow pipe provided on the oblique plate to function as an upward and downward passage of fluid, upper and lower caps provided on the oblique plate, and legs connected to the upper frame, the upper cap having a plate and at least one support member supporting the plate.

12. The water treatment plant as claimed in claim 11, wherein a plurality of reinforcing members are disposed on the oblique surface.

13. The water treatment plant as claimed in claim 11, wherein the fluid flow pipes provided in the reaction unit bodies have different lengths.

14. The water treatment plant as claimed in claim 11, wherein the fluid flow pipe has a funnel-like shape or a conical shape whose upper area is wider than the lower area thereof.

15. The water treatment plant as claimed in claim 1, wherein the reaction unit body includes a plate having a plurality of oblique plates, a support member protruding from a lower portion of the plate and connected to another reaction unit body, and a plurality of fluid flow pipes provided on the oblique plates of the plate to function as upward and downward passages of fluid.

16. The water treatment plant as claimed in claim 15, wherein the intervals between the fluid flow pipes of the reaction unit bodies are different, and when the reaction unit bodies are stacked, the fluid flow pipes of the reaction unit bodies are deviated from each other.

17. The water treatment plant as claimed in claim 15, wherein peripheral portions protruding downward are formed at the periphery of the oblique surface.

18. The water treatment plant as claimed in claim 15, wherein the fluid flow pipe has a funnel-like shape or a conical shape whose upper area is wider than the lower area thereof.

19. The water treatment plant as claimed in claim 1, wherein the gas contains air or methane gas to selectively perform an aerobic or anaerobic treatment.

20. The water treatment plant as claimed in claim 1, wherein the bubbling unit includes an inlet pipe connected to the inside of the reactor, at least one nozzle protruding from the inlet pipe, and a blower provided on one side of the inlet pipe to blow out the gas.

21. The water treatment plant as claimed in claim 1, wherein a circulation unit is further provided on one side of the reactor and includes a pipe, a circulation pump mounted to the pipe, upper, intermediate, and lower pipes protruding from the pipe and connected to the stages of the interior of the reactor, and when the circulation pump is driven, deposits at the stages of the interior of the reactor circulate or accumulated.

22. The water treatment plant as claimed in claim 1, wherein the reactor includes a hopper unit at a lower portion thereof and an agitation unit provided in the hopper unit to agitate the fluid interior of the reactor.

23. The water treatment plant as claimed in claim 22, wherein the agitation unit includes a first pipe connected to the upper side of the hopper unit, a second pipe connected to the lower side of the hopper unit, and a pump connected to the first and second pipes to pump fluid.

24. The water treatment plant as claimed in claim 1, wherein a gas discharge unit is further provided on the other side of the reactor and includes a main pipe, a value mounted to the main pipe, and an auxiliary pipe protruding from the main pipe and communicated with the stay spaces formed at the stages of the interior of the reactor, and when the valve is opened, the gas and bubbles collected in the stay space are discharged outside the reactor through the auxiliary pipes and the main pipe.

25. A water treatment method comprising:
a pre-treatment step of removing foreign substances in introduced water and crushing the foreign substances using a crusher;
a pre-denitrification step of removing nitrogen from the pre-treated waste water through a denitrification process;
a bubbling and denitrification step of injecting gas and oxidizing organic materials and nitrogen through an aerobic process by supplying the denitrified waste water into a reactor in which a plurality of reaction unit bodies are stacked and mixing the denitrified water with a gas; and
a step of aerobically treating the introduced water, depositing sludge through solid-liquid separation, and returning some sludge to the reactor.

26. The water treatment plant as claimed in claim 25, further comprising an anaerobic treatment step before the pre-treatment step, wherein methane gas is injected into the reactor in the anaerobic treatment step and the anaerobic treatment is performed in the process of the methane gas and waste water passing through the reaction unit bodies.

27. The water treatment method as claimed in claim 26, wherein in the bubbling, denitrification, anaerobic treatment, and deposition steps, a plurality of reaction unit bodies are disposed inside the reactor to divide the reactor in multiple stages, and gas layers are formed between the stages to interrupt flow of fluid or increase the fluidity of liquid and thereby increase the circulation efficiency and reaction speed between gas and liquid.

* * * * *